(12) United States Patent
Mahieu et al.

(10) Patent No.: US 6,750,300 B2
(45) Date of Patent: Jun. 15, 2004

(54) HOT MELT PAINT COMPOSITION

(75) Inventors: Philip Mahieu, Perk-Steenokkerzeel (BE); Faridoon Qazi, Malmö (SE); Didier Vanderveken, Brussels (BE); Kent Raabjerg Sörensen, Perstorp (SE); Martinus Adrianus Anthonius Maria Koenraadt, Duiven (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/978,919

(22) Filed: Oct. 16, 2001

(65) Prior Publication Data

US 2002/0111430 A1 Aug. 15, 2002

Related U.S. Application Data

(60) Provisional application No. 60/246,296, filed on Nov. 7, 2000.

(30) Foreign Application Priority Data

Oct. 16, 2000 (EP) .............................................. 00203563

(51) Int. Cl.[7] .............................................. C08F 283/00
(52) U.S. Cl. ...................... 525/523; 525/107; 525/124; 525/185; 525/528; 525/533
(58) Field of Search ................................ 525/523, 528, 525/533

(56) References Cited

FOREIGN PATENT DOCUMENTS

| DE | 2237674 | 2/1974 | ............... C09J/3/16 |
| EP | 0562660 A1 | 9/1993 | ............... C09D/5/08 |
| EP | 0604815 A2 | 7/1994 | ......... C09D/163/00 |
| EP | 0539941 | * 8/1998 | |
| GB | 1286824 | 8/1972 | ............... C08J/1/02 |
| JP | 58023830 | 2/1983 | ............... C08J/5/24 |
| JP | 03041181 | 2/1991 | .......... C09J/201/00 |

OTHER PUBLICATIONS

"Latent Amine Catalysts for Epoxy–Carboxy Hybrid Powder Coatings. Investigations On Phase Change Control of Reactivity" by S. Peter Pappas, Victoria D. Kuntz and Betty C. Pappas, in *Journal of Coatings Technology*, vol. 63, No. 796, May 1991, pp. 39–46.

Database STN Online! Chemical Abstracts Service, Colombus, Ohio, US; Database accession No. 72:123008, Jackson, W.E.A.: "Polyester hot melt adhesives. I. Factors affecting adhesion to epoxy resin coatings" XP002165984 (Abstract).

* cited by examiner

*Primary Examiner*—Ana L. Woodward
(74) *Attorney, Agent, or Firm*—Lainie E. Parker

(57) ABSTRACT

Hot melt coating composition, particularly suitable for low viscosity requiring application techniques, the composition having a Tg below 5° C., preferably below −20° C., and a viscosity below 2,000 mPa.s, preferably below 600 mPa.s, measured at 70° C. at a shear rate of 10 s$^{-1}$. The composition includes at least one amorphous binder having a Tg below 5° C., preferably below −20° C., and/or at least one crystalline or semi-crystalline binder having a melting point or melting range below 150° C. The composition can be a one component system comprising an epoxy-functional resin, a polyamine having cyanamide groups, preferably dicyandiamide, and a blocked catalyst which is unblocked at an elevated temperature below the curing temperature. Alternatively, the composition may be one component of a two-component system based on isocyanate/polyol crosslinking.

18 Claims, No Drawings

HOT MELT PAINT COMPOSITION

This application claims priority based on European patent application No. 00203563.2, filed Oct. 16, 2000, and U.S. provisional patent application No. 60/246,296, filed Nov. 7, 2000.

FIELD OF THE INVENTION

The invention relates to a thermosetting hot melt paint composition and to an application method for such hot melt paint compositions. Hot melt paint compositions are typically first heated until the required application viscosity is reached. Subsequently, the compositions are applied and cured, for instance by further raising the temperature to the curing temperature. In general, hot melt coatings are substantially free of volatile organic compounds (VOC).

BACKGROUND OF THE INVENTION

EP-A 0 604 815 discloses a solvent-free thermosetting coating composition for silk screen printing. The coating composition comprises a blend of liquid and solid epoxy resins and has a high viscosity, making this coating composition unsuitable for use in application techniques requiring a low viscosity, such as curtain coating.

Application techniques such as curtain coating are specifically useful when thin layers have to be applied. A particular example of an application requiring thin film layers is mirror backing, when a coating has to be applied to the back of a reflective metallic layer of mirrors to protect them against corrosion and mechanical and chemical impact. These mirror backing coatings are typically applied in one or more layers having a thickness of the order of about 20–100 microns.

Hitherto, paint compositions used in application techniques requiring a low viscosity, such as the mirror backing coating disclosed in EP-A 0 562 660, have contained solvents. However, the use of solvent borne paint compositions is encountering ever more serious environmental difficulties. For environmental as well as economic reasons, the solvent content should be minimized. To acquire anticorrosive properties, mirror backing coatings typically include corrosion inhibitors, most of which are detrimental to people's health or the environment.

SUMMARY OF THE INVENTION

The object of the invention is to provide a substantially VOC-free coating composition which can be used at application temperatures between 100–160° C., or at even lower temperatures using application techniques requiring a low viscosity, such as curtain coating or spray coating.

The object of the invention is achieved with a hot melt paint composition having a Tg below 5° C., preferably below −20° C. and a viscosity below 2,000 mPa.s, preferably below 600 mPa.s, measured at 80° C. at a shear rate of 10 $s^{-1}$. It has been found that such hot melt compositions, unlike the prior art hot melt paints, are suitable for application techniques requiring a low viscosity without the need to add solvents. As a result of the low viscosity of the hot melt paint composition according to the invention, relatively low application temperatures, e.g., below 120° C., can be used while still maintaining good paint properties like flow and appearance. The composition according to the invention can, e.g., be solid or liquid at room temperature.

DETAILED DESCRIPTION OF THE INVENTION

In a preferred embodiment of the hot melt paint composition according to the present invention, the composition includes at least one amorphous binder having a Tg below 5° C., preferably below −20° C., and/or at least one crystalline or semi-crystalline binder having a melting point or melting range below 150° C. Semi-crystalline and/or crystalline binders are generally characterized by a sharp phase change resulting in very low melt viscosities after melting. Also combinations of amorphous and (semi)-crystalline binders can be used. By combining amorphous binders with (semi)-crystalline binders, the melt viscosity of the hot melt paint composition can easily be adjusted to the desired level. Optionally, the binder may have a hyperbranched or dendritic structure.

In order to examine if a binder is crystalline, semi-crystalline, or amorphous, these types of phase changes can be detected by Differential Scanning Calorimetry (DSC), as described in *Encyclopedia of Polymer Science and Engineering,* Volume 4, pages 482–519, 1986 (Wiley Interscience). A binder is considered to be amorphous if it shows a discernible glass transition temperature (Tg) and has neither crystallization nor melting peaks. A resin is considered to be semi-crystalline if it shows a discernible Tg and at least one melting peak. In general, when different melting peaks in a DSC curve are observed, these multiple peaks are specified by a melting range. If a binder does not show any Tg on heating from −60° C., but only a sharp melting peak, the binder is considered to be crystalline.

The binder of the hot melt coating composition may for example be an alkyd resin, an acrylic resin, a polyester resin, a urethane oil or resin, a vinyl polymer, a vinyl halide polymer, a phenol-formaldehyde resin, an amino resin, an epoxy resin, or modifications and/or combinations thereof.

The binder is either self-crosslinking or is used in combination with a corresponding crosslinker, for example blocked or unblocked isocyanates or amino-functional crosslinkers. Suitable examples of amino-functional crosslinkers are for instance melamine-formaldehyde resins like hexamethoxy methylol melamine (HMMM) or tris-alkoxy carbonyl amino triazine (TACT) or derivatives thereof. Commercially available HMMM resins are for example Beetle® 370, Beetle® 3745, and Beetle® 3747, all available from BIP. Suitable isocyanates are for example Desmodur® N3300, available from Bayer, and Vestanat® T1890, available from Creanova.

Binders reactive with these isocyanate or amino-functional crosslinkers are for instance hydroxy-functional binders. Preferred hydroxy-functional binders are acrylic polyols, polyether polyols, and polyester polyols. Examples of suitable amorphous polyester polyols are Desmophen® 670, 800, 1155, and Desmophen® VPLS 2249/1, all available from Bayer. A suitable example of a dendritic polyol is Boltorn® H10, available from Perstorp Specialty Chemicals.

Polyol/isocyanate crosslinking systems as such are highly reactive. A suitable way to prevent premature curing is to use internally or externally blocked isocyanates. An example of an internally blocked polyisocyanate crosslinker is a cycloaliphatic polyuretdione based on isophorondiisocyanate, Vestagon® EP-BF 1320, available from Creanova.

Another way to prevent the premature crosslinking of such highly reactive crosslinking systems is the use of two-component systems, requiring separate storage of the reactive components and special application equipment. The reactive components are mixed with each other just before or during application, for instance in a two-component spray-gun. Such a two-component arrangement is not only suitable for isocyanate/polyol crosslinking systems using unblocked isocyanates, but also for other highly reactive crosslinking systems, for instance for epoxy/amine and acryloyl/amine crosslinking systems.

Hot melt coating compositions based on polyol/isocyanate chemistry have the advantage of combining a low VOC level or even zero VOC with a high level of film performance. Such hot melt coating compositions are particularly suitable for use in for example the automotive and the vehicle refinish industry.

Another class of suitable binders consists of epoxy resins, optionally in combination with compounds containing epoxy-reactive groups, e.g., amines, polycarboxylic acids and/or anhydrides.

Particularly suitable epoxy resins are for example Epikote® 828, Epikote® 1001, and Epikote® 1002. Viscous epoxy resins, such as Epikote® 1004, should preferably be used in smaller amounts in order to obtain the required viscosity. All the aforementioned Epikote® resins are available from Shell Chemicals.

If epoxy resins are included in the hot melt coating composition according to the present invention, it is preferred to use a compound containing cyanamide groups and/or derivatives, such as dicyandiamide, accelerated dicyandiamide, substituted dicyandiamide, or cyclic amidines. Mirror backing coatings formulated with cyanamide-functional compounds have the advantage that they can form a complex with the silver ions present in the reflective mirror layer, particularly if this layer is copper-free. This improves the anticorrosive properties of the coating. The addition of anticorrosive pigments in that case can be reduced or even eliminated. Dicyandiamide gives optimum results in this respect. When using cyanamide groups and/or derivatives in the paint composition according to the present invention in a mirror backing application, improved adhesion to silver layers is observed. This allows formulation of mirror backing coatings without silane functional compounds, which are commonly used in prior art systems to improve adhesion.

The required melt viscosity of the composition can be adjusted by optimization of the binder properties, such as the molecular weight and molecular structure. Preferably, the mean average molecular weight Mn of the binder or binders is 1000–10000 g/mol, more preferably between 2000–6000 g/mol.

Another way of adjusting the composition's viscosity is through the use of reactive diluents. Reactive diluents generally are low-molecular weight compounds showing low viscosity and act as solvents during the formulation and processing of the coating.

Unlike non-reactive solvents, reactive diluents can copolymerize with a binder or another constituent present in the hot melt composition. The mean average molecular weight Mn of the reactive diluents in general is below 1000 g/mol, preferably below 500 g/mol. The amount of functional groups, the functionality, of the reactive diluent is at least one, preferably two or higher in which case the reactive diluents can act as a crosslink enhancer. Examples of suitable reactive diluents are low-viscous glycidyl ethers, alkylene carbonates, oxetanes, epoxidized oils, polyols and/or modifications thereof like alkoxylated polyols. Suitable examples of glycidyl ethers are cyclohexane dimethanol-diglycidyl ether, such as Araldite® DY 0395, and trimethylolpropane-triglycidyl ether, such as Araldite® DY 0396, the two Araldite® products being available from Ciba Specialty Chemicals. Suitable examples of polyols are di-trimethylolpropane and alkoxylated polyols, such as Polyol TP30®, an ethoxylated trimethylolpropane, available from Perstorp Specialty Chemicals. Suitabel examples of alkylene carbonates are ethylene carbonate and propylene carbonate.

The composition according to the invention is substantially VOC-free. In principle, no additional solvent is added when preparing the composition. Moreover, the residual solvent content originating from the manufacture of any of the ingredients should not exceed 5% by weight.

As set out above, highly reactive crosslinking systems can be used in two-component hot melt systems. However, hot melt coatings are easier handled as one-component systems, using a crosslinker which is reactive with the binder only at a temperature above the application temperature. In such systems, a good balance between chemical stability and reactivity is essential.

If the chemical stability is not optimal, for example because of a too high intrinsic reactivity, crosslinking could take place prematurely, i.e. before the coating is applied to the substrate, resulting in clogging of the application equipment used and poor coatings properties.

Good chemical stability resulting from low reactivity may give too slow curing to fulfil regular requirements. In such a case, a catalyst could be included to enhance the reactivity. The choice of catalyst depends on the crosslinking chemistry in the hot melt formulation. By selecting a suitable catalyst a good balance between chemical stability and reactivity can be obtained. If a catalyst is used, it preferably is present in an amount of 0.5–5 wt. % on total formulation. An optimum amount of catalyst is 1–3 wt % on total formulation. Depending on the type of crosslinking chemistry of the hot melt coating composition, the catalyst could be an acid, a base or a combination thereof.

Preferably, the catalyst is latent or blocked. Using latent or blocked catalysts is an effective way of avoiding premature crosslinking. To control the activity, different mechanisms and blocking agents can be used, such as alcohols, water, volatile acids and UV decomposable compounds. The catalyst may for instance be unblocked by raising the temperature. A suitable example of this is diaza[4.3.0] bicycloundec-7-ene blocked with benzoic acid or formic acid, as described in U.S. Pat. No. 5,219,958. Another catalyst which is deblocked upon heating is for example Dyhard® UR 500, which is an amine based catalyst blocked with an isocyanate. This type of catalyst is particularly suitable for balancing the chemical stability and the reactivity of a hot melt coating composition based on an epoxy resin and a polyamine such as dicyandiamide. Suitable latent catalysts are for example amic acids, derived from carboxylic acid anhydrides and diamines. On heating, these zwitterionic amic acids undergo thermally induced intramolecular cyclization to imides, which can catalyze various reactions.

Preparation of these latent amine catalysts are disclosed in *Latent Amine Catalysts for Epoxy-Carboxy Hybrid Powder Coatings. Investigations on Phase Change Control of Reactivity* by S. P. Pappas, V. D. Kuntz and B. C. Pappas, Journal of Coatings Technology, Vol. 63, No. 796, May 1991.

If the composition is based on an acid induced crosslinking mechanism like amino/polyol crosslinking, the coating composition may optionally comprise an acid catalyst. Examples of acid-type catalysts are paratoluene sulphonic acid and dodecylbenzene sulfonic acid. An example of a blocked acid catalyst is Nacure® 3525, available from King Industries, which is based on di-nonyl naphthalene disulphonic acid.

The hot melt coating composition according to the invention may comprise pigments and/or additives, such as fillers, dispersing agents, degassing agents, adhesion promoters, matting agents, surfactants, flow promoters, or waxes.

The hot-melt coating composition described can be prepared with equipment commonly known in the paint industry. In general, all raw materials except the crosslinkers and the catalysts are mixed together in a high-speed dissolver at room temperature or elevated temperature. In an optional next step, the pigments are dispersed in a high-shear dispersing apparatus such as a pearl mill or sand mill. Finally, the crosslinkers and optional catalysts are added and the whole is mixed until a homogeneous mixture is obtained. In cases where the contact time between the reactive components should be kept to a minimum, dispersing equipment with a short residence time can be used. A suitable apparatus where reactive components can be mixed very effectively within a short time is an extruder or other equipment based on rotor/stator technology.

The hot melt paint composition can be applied by a method comprising the following steps:

heating the composition until the application temperature is reached;

applying the composition as a coating to a substrate, and heating the applied coating to at least its curing temperature until complete curing.

The heating step can for example be carried out in heated containers, after which the composition is supplied to a heated applicator.

The hot melt paint composition according to the invention is particularly useful for application techniques requiring a low viscosity, such as curtain coating, wherein the heated composition flows via a narrow horizontal slit onto a substrate passing below the slit. Other application techniques requiring a low viscosity for which the coating composition can be used are, for instance, heated roller or hot spray techniques. Heated rollers are for instance used for applying coil coatings. Other application techniques where the viscosity may be of less importance, such as die application, may also be used, if so desired.

In the case of two-component systems, the components are preferably heated separately. Heating of the composition may be carried out in any suitable heating or melting apparatus. The heated composition can be supplied to the applicator through a heated hose by means of a suitable pump. When using the two-component system, prior to application the components can be mixed in any suitable melt mixing apparatus, which may be a static mixer or a dynamic mixer, for example a Banbury mixer or a Z-blade mixer. Alternatively, the components can be mixed during application. The temperature of the applicator will in general be in the range of 50 to 160° C., preferably from 60 to 120° C. For thermal curing of the applied coating composition, the curing temperature can be up to 260° C., and preferably ranges from 60–170° C., depending upon the chemical composition, type of substrate used and the application field.

The curing time in general is less than 30 minutes. In particular cases the curing time can be very short like for coil coatings where curing can be flash curing for 2 minutes or less at 260° C. PMT, peak metal temperature.

The coating composition according to the present invention can be applied in thin layers. The thickness of the layers after curing can for instance be lower than 100 μm.

A broad range of substrates can be coated with the hot melt paint composition of the present invention. Due to the low melt viscosity, the coating composition can be applied on metal and glass substrates, for instance mirror back sides, but also on temperature sensitive substrates such as plastic and wood. The composition according to the invention can also be used for coil coatings.

Although the hot melt coating composition is particularly suitable for use as a mirror backing coating, it is also suitable for other uses where for instance uniform thin, particularly high performance layers are required or where the use of application techniques requiring a low viscosity is desired. A particular example is the spray application of 2-component polyol/isocyanate systems as top coat on metal or plastic substrates.

The invention is further illustrated by the following examples. In these examples the compositions listed below are available as indicated.

| | |
|---|---|
| Araldite ® DY 0396 | trimethylolpropane tri-glycidylether, having a Tg below −50° C.; available from Ciba Specialty Chemicals; |
| Baysilon ® OL 17 | flow agent, commercially available from Bayer; |
| Beetle ® 370 | solvent-free hexamethoxy methylol melamine resin, having a Tg below −50° C., commercially available from BIP; |
| Benzoin | degassing agent, commercially available from DSM, the Netherlands; |
| Byk ® A 530 | flow control agent, commercially available from Bvk; |
| Byk ® 165 | dispersing agent, commercially available from Byk; |
| Desmophen ® 670 | amorphous polyester polyol, having a Tg below −50° C., commercially available from Bayer; |
| Desmophen ® VPLS 2248 | amorphous polyester polyol having a Tg below −50° C. and a viscosity of 154 mPa at 70° C. at a shear rate of 10 s$^{-1}$, commercially available from Bayer; |
| Desmophen ® 1155 | amorphous polyester polyol having a Tg below −50° C.and a viscosity of 84 mPa at 70° C. at a shear rate of 10 s$^{-1}$, commercially available from Bayer; |
| Desmodur ® N3300 | polyisocyanate, having a Tg below −50° C.; commercially available from Bayer; |
| Dyhard ® 100SF | dicyandiamide, commercially available from SKW Trostberg AG; |
| Dyhard ® UR 500 | blocked amine catalyst, available from SKW Trostberg AG; |
| Epikote ® 828 | epoxy-functional resin, having a Tg below −50° C.; commercially available from Shell Chemicals; |
| Epodil 750 | di-functional glycidylether, having a Tg below −50° C.; commercially available from Air Products; |
| Kronos ® 2310 | titanium dioxide pigment, available from Kronos International Inc. |
| Nacure ® 3525 | di-nonylnaphthalene sulphonic acid, catalyst available from King Industries; |
| Polyol TP ® 30 | ethoxylated trimethyloipropane, reactive diluent, commercially available from Perstorp Specialty Chemicals. |

In the examples, the following abbreviations are used:

| | |
|---|---|
| DBTDL | dibutyl tin dilaurate; |
| PA/DEP | amic acid based on phthalic anhydride and N,N-diethylaminopropylamine; |
| Tg | glass transition temperature. |

In the examples, all amounts of contents are given in grams, unless indicated otherwise.

EXAMPLES 1–7

In Examples 1–7, hot melt coating compositions were prepared from the raw materials given in Table 1.

TABLE 1

| Raw Materials | Ex. 1 | Ex. 2 | Ex. 3 | Ex. 4 | Ex. 5 | Ex. 6 | Ex. 7 |
|---|---|---|---|---|---|---|---|
| Epikote ® 828 | 10 | 250.1 | 335 | 1337 | 264.5 | 317.6 | 372 |
| Beetle ® 370 | 76.6 | 26.8 | | | | | |
| Desmophen ® 1155 | 113.3 | 39.7 | | | | | |
| Desmophen ® 670 | 113.3 | 39.7 | | | | | |
| Dyhard ® 100 SF | | 17.3 | 37.2 | | 37.7 | 42 | 37.8 | 30 |
| Polyol TP ® 30 | 54 | 18.9 | | | 26.5 | 17.7 | | |
| Araldite ® DY 0396 | | | | | | 30.3 | 16.7 |
| Epoxidised linseed oil | | | | | | 52.7 | |
| Talc | 192 | 192 | 192 | 192 | 192 | 192 | 192 |
| Barium sulfate | 144.2 | 144.2 | 144.2 | 144.2 | 144.2 | 144.2 | 144.2 |
| Kronos ® 2310 | 37 | 37 | 37 | 37 | 37 | 37 | 37 |
| Carbon black | 3 | 3 | 3 | 3 | 3 | 3 | 3 |
| Zinc oxide | 192 | 192 | 192 | 192 | 192 | 192 | 192 |
| Lead cyanide | 5 | 5 | 5 | 5 | 5 | 5 | 5 |
| Byk ® 165 | 24 | 24 | 24 | 4 | 4 | 24 | 24 |
| Benzoin | 9.6 | 9.6 | 6.9 | | | 6.9 | 4 |
| DBTDL | | | 1.6 | | | 1.6 | |
| Dyhard ® UR 500 | | 6.2 | 17.6 | 18.8 | 12.7 | 17.6 | |
| Nacure ® 3525 | | 7.7 | | | | | |
| PA/DEP | | | | | | | 12 |
| Butyldiglycol | | | | | | | 40 |
| Epodil ® 750 | | | | | | | 41 |

In Examples 2–6, Epikote® 828 was used as the main binder, whereas in Example 1 only a minor amount of this compound was used as an adhesion promoter.

Beetlee® 370 and Dyhard® 100 SF were used as crosslinkers in the compositions. DBTDL, Dyhard® UR 500, Nacure® 3525 and PA/DEP were used as catalysts.

All raw materials except the crosslinkers and the catalysts were first mixed together in a high-speed dissolver at room temperature or elevated temperature.

Subsequently, the pigments were dispersed in a pearl mill at 2,500 rpm for 40 minutes at room temperature. After that, the crosslinkers and the catalysts were added and the whole was mixed for 10 minutes at 2,500 rpm. The compositions of Examples 1–7 were heated to a temperature of 80° C., when the viscosity became low enough for application, and were subsequently applied to a mirror backing at a temperature of 80° C. and cured in an infrared air circulation oven for five minutes at an oven temperature of 150° C.

The following test methods were used to test the viscosity and Tg of the compositions:

| | |
|---|---|
| Viscosity (80° C., 10 s$^{-1}$) | ISO 53229 |
| Tg$_{uncured}$ | DSC, 10° C./min |

The film properties were tested using the following test methods:

| | |
|---|---|
| Gloss | ISO 2813, measuring angle was 85 degrees; |
| Adhesion | ISO 2409 |
| Persoz hardness | ISO 1522 |
| Tg$_{cured\ film}$ | DSC, 10° C./min |

Edge corrosion was tested in accordance with the CASS test, as defined in ISO 1456, and by means of the salt spray test defined in DIN 50021. Resistance to water vapour was tested in accordance with the humidity test of industrial standard DIN 50017.

The test results are listed in the following Table 2.

TABLE 2

| Test | Ex. 1 | Ex. 2 | Ex. 3 | Ex. 4 | Ex. 5 | Ex. 6 | Ex. 7 |
|---|---|---|---|---|---|---|---|
| Thickness ($\mu$m) | 36 | 55 | 63 | 40 | 35 | 40 | 40 |
| Adhesion | 0 | 0 | 0 | 0 | 0 | 0 | 0 |
| Persoz (sec) | 93 | 304 | 300 | 320 | 308 | 314 | 300 |
| Gloss (%) | 78 | 100 | 100 | 100 | 100 | 100 | 100 |
| CASS test (haze) | No | No | No | No | No | No | No |
| CASS test (spots) | Few | No | No | No | No | No | No |
| CASS test (edge corrosion in $\mu$m) | 400 | 100 | 100 | 150 | 150 | 200 | 150 |
| Humidity test (haze) | No | No | No | Slight | Slight | Slight | No |
| Humidity test (blisters) | No | No | No | No | No | No | No |
| Salt spray (haze) | No | No | No | No | No | No | No |
| Salt spray (edge corrosion in $\mu$m) | 300 | 150 | 150 | 40 | 40 | 20 | 20 |
| Viscosity (mPa.s) | 436 | 683 | 938 | 537 | 365 | 631 | 500 |
| Tg$_{uncured}$ (° C.) | −50 | −27 | −21 | −23 | −38 | −36 | AG |
| Tg$_{cured\ film}$ (° C.) | 18 | 79 | 109 | 78 | 82 | 93 | 85 |

EXAMPLE 8

In example 8, the composition according to example 2 was prepared without lead cyanide. Edge corrosion according to the CASS test was 400 $\mu$m.

EXAMPLE 9

Two-Component Hot Melt Coating Composition

A solvent-free two-component hot melt coating composition was prepared in the following way. In a dissolver, a first component A was made of 35.08 g of Desmophen® VPLS 2248, 0.2 g of Byk® A 530, 0.1 g of Baysilon®, and 0.1 g of DBTDL at a temperature of 70° C.

Separately, a second component B consisting of 64.52 g of Desmodur® N3300 was heated to a temperature of 70° C. and mixed with the first component A just prior to application. The mixture was sprayed onto a phosphatized steel panel (Bonder® 26S60 OC) and cured at 60° C. for 30 minutes. The dry layer thickness was about 50 $\mu$m.

The following test methods were used:

| | |
|---|---|
| Impact resistance | ASTM D 2794-93 |
| MEK resistance | ISO 2812 |

Gloss, Tg$_{uncured}$ of component A, Tg$_{cured\ film}$, and viscosity of components A and B before mixing were tested according the methods used for Examples 1–8.

The obtained clear coat had the properties shown in Table 3.

TABLE 3

| Test | Result |
|---|---|
| Viscosity (80° C., 10 s$^{-1}$) component A | 100 mPa.s |
| Viscosity (80° C., 10 s$^{-1}$) component B | 65 mPa.s |
| Impact resistance | 160 kg/m |
| Gloss | 100% |
| Tg$_{uncured}$ of component A | <−50° C. |
| Tg$_{cured\ film}$ | 40.2° C. |
| MEK resistance | >200 double rubs |

What is claimed is:

1. Thermosetting hot melt paint composition, the hot melt coating composition having a Tg below 5° C. and a viscosity below 2,000 mPa.s measured at 80° C. at a shear rate of 10 $s^{-1}$.

2. Composition according to claim 1, wherein the hot melt coating composition has a Tg below −20° C., and a viscosity below 600 mPa.s, measured at 80° C. at a shear rate of 10 $s^{-1}$.

3. Composition according to claim 1, wherein the composition includes at least one amorphous binder having a Tg below 5° C. and/or at least one crystalline or semi-crystalline binder having a melting point or melting range below 150° C.

4. Composition according to claim 3, wherein the at least one amorphous binder has a Tg below −20° C.

5. Composition according to claim 1, wherein the composition comprises at least one epoxy-functional resin and at least one polyamine having cyanamide groups.

6. Composition according to claim 5, wherein the at least one polyamine has dicyandiamide groups.

7. Composition according to claim 1, wherein the composition comprises at least one catalyst in an amount of 0.5–5 wt. %, preferably 1–3 wt. % on total formulation.

8. Composition according to claim 7, wherein the amount of catalyst is 1–3 wt. % on total formulation.

9. Composition according to claim 7, wherein the at least one catalyst is a blocked or latent catalyst which is unblocked or activated at an elevated temperature below the curing temperature of the coating composition.

10. Composition according to claim 9, wherein the blocked or latent catalyst is a blocked or latent amine.

11. Composition according to claim 10, wherein the latent amine catalyst is an amic acid derived from carboxylic acid anhydrides and diamines.

12. Composition according to claim 1, wherein the composition comprises at least one amino resin.

13. Composition according to claim 12, wherein the at least one amino resin is present in combination with one or more polyamines having cyanamide groups.

14. Composition according to claim 13, wherein the at least one polyamine has dicyandiamide groups.

15. Composition according to claim 1, wherein the composition is a component of a two-component system, comprising either one or more crosslinkers or a binder.

16. Composition according to claim 15, wherein the two-component system includes a first component comprising a polyisocyanate crosslinker and a second component comprising one or more binders having isocyanate-reactive groups.

17. Composition according to claim 1, wherein the composition contains a reactive diluent.

18. Composition according to claim 17, wherein the reactive diluent is glycidyl ether, epoxidized oil, polyol or modifications thereof.

* * * * *